United States Patent
Hirano et al.

(10) Patent No.: US 6,315,106 B1
(45) Date of Patent: Nov. 13, 2001

(54) CHIP CONVEYOR AND MACHINING SYSTEM USING THE SAME

(75) Inventors: Hidekazu Hirano, Tokoname; Yoshihiro Arai, Chiryu; Takeshi Nishikayama, Kariya, all of (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 09/415,064

(22) Filed: Oct. 12, 1999

(30) Foreign Application Priority Data

Oct. 9, 1998 (JP) ................................. 10-287914

(51) Int. Cl.⁷ ................................................ B65G 47/18
(52) U.S. Cl. .......................... 198/542; 198/544; 198/545; 82/52; 409/137; 29/DIG. 94
(58) Field of Search ................. 82/52; 198/540–545; 409/137; 29/DIG. 94

(56) References Cited

U.S. PATENT DOCUMENTS 5,979,039 * 11/1999 Rehm ..................................... 29/563
6,206,621 * 9/1999 Sebring ................................. 409/137

FOREIGN PATENT DOCUMENTS 6-247523   9/1994   (JP).
8-19932    1/1996   (JP).
10-202470  8/1998   (JP).

* cited by examiner

*Primary Examiner*—Christopher P. Ellis
*Assistant Examiner*—Mark A. Deuble
(74) *Attorney, Agent, or Firm*—Oblon, Spivak, McClelland, Maier & Neustadt, P.C.

(57) ABSTRACT

A machining system includes a plurality of machine tools, a transfer apparatus configured to move a workpiece and a plurality of chip conveyors. Each of the plurality of chip conveyors includes a feeding device, a discharging opening and at least one of a first opening and a second opening. The first opening communicates with the discharging opening of an adjacent chip conveyor of the plurality of chip conveyors. The second opening receives chips generated by at least one of the plurality of machine tools. The discharging opening is for discharging the chips in the chip conveyor. The feeding device is configured to move the chips in the chip conveyor toward the discharging opening. A total length of the chip conveyors is easily regulated by changing the number of the chip conveyors so that the machining system is easily and quickly reconstructed.

6 Claims, 8 Drawing Sheets

CHIP CONVEYOR AND MACHINING SYSTEM USING THE SAME

BACKGROUND OF THE INVENTION

1. Field of the Invention

The present invention relates to a chip conveyor for use in conjunction with another chip conveyor to remove chips from machine tools, and a machining system using the same.

2. Description of the Related Art

In a machining system having plural machine tools, e.g., a flexible transfer line, chips created during machining of workpieces are removed by a chip conveyor from the machining system. Two types of the chip conveyors are generally used, as shown in FIGS. 1 and 2.

Figure 1:
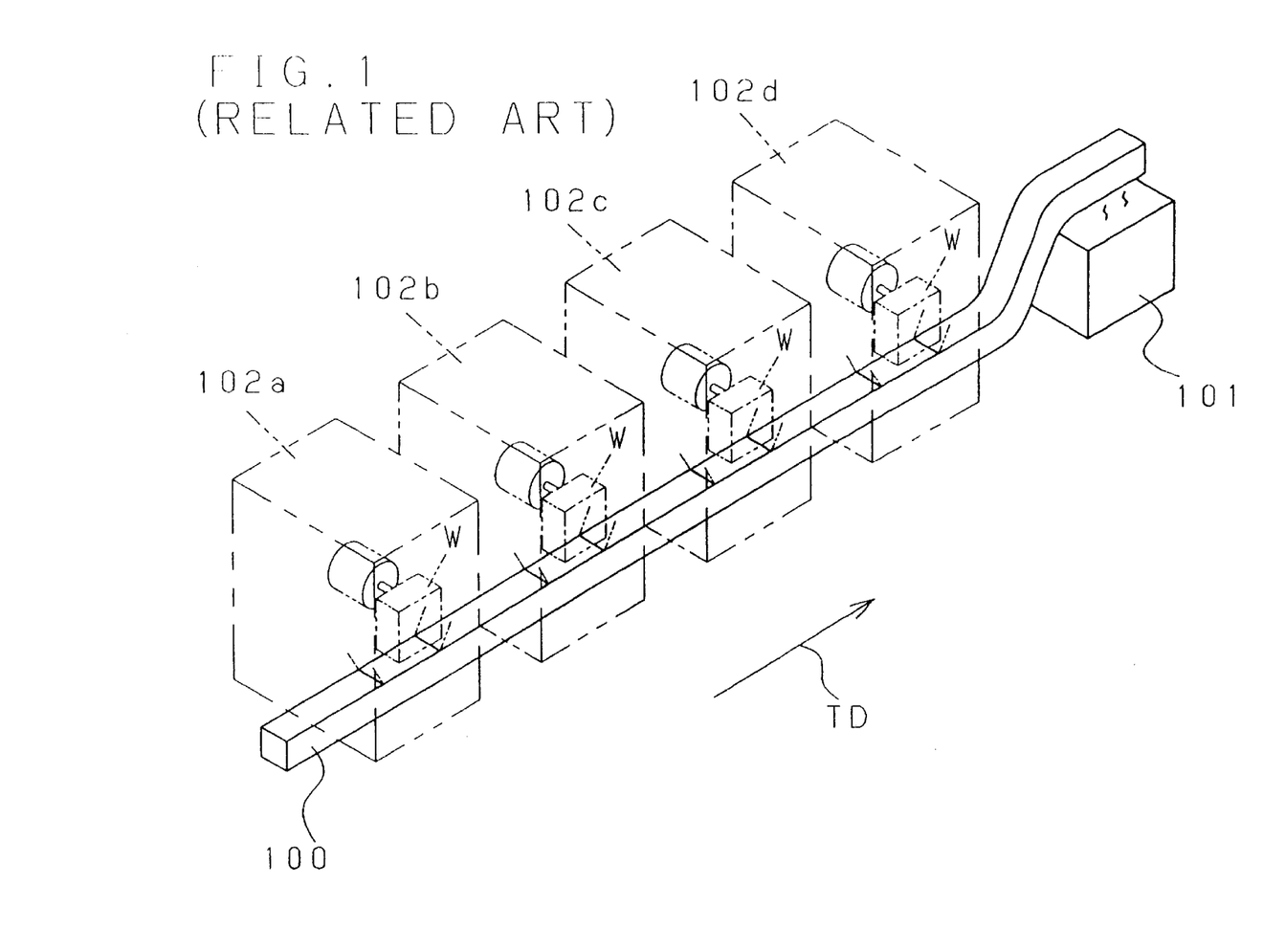
FIG. 1 is a perspective view showing an example of a conventional machining system.

FIG. 1 shows a machining system having a single chip conveyor 100 servicing a plurality of (i.e., four) machine tools 102a to 102d spaced along a transfer direction TD. Workpieces W to be machined by the machine tools 102a to 102d are delivered in the transfer direction TD for the next machining.

The chip conveyer 100 extends under each machining area of the machine tools 102a to 102d. Chips generated in the machine tools 102a to 102d are carried by the chip conveyor 100 to a chip container 101 outside of the machining system. Since the length of the chip conveyor 100 depends on the number of the machine tools or the length of the machining system, the chip conveyor must be reconstructed for every change in number of the machine tools of the machining system.

Figure 2:
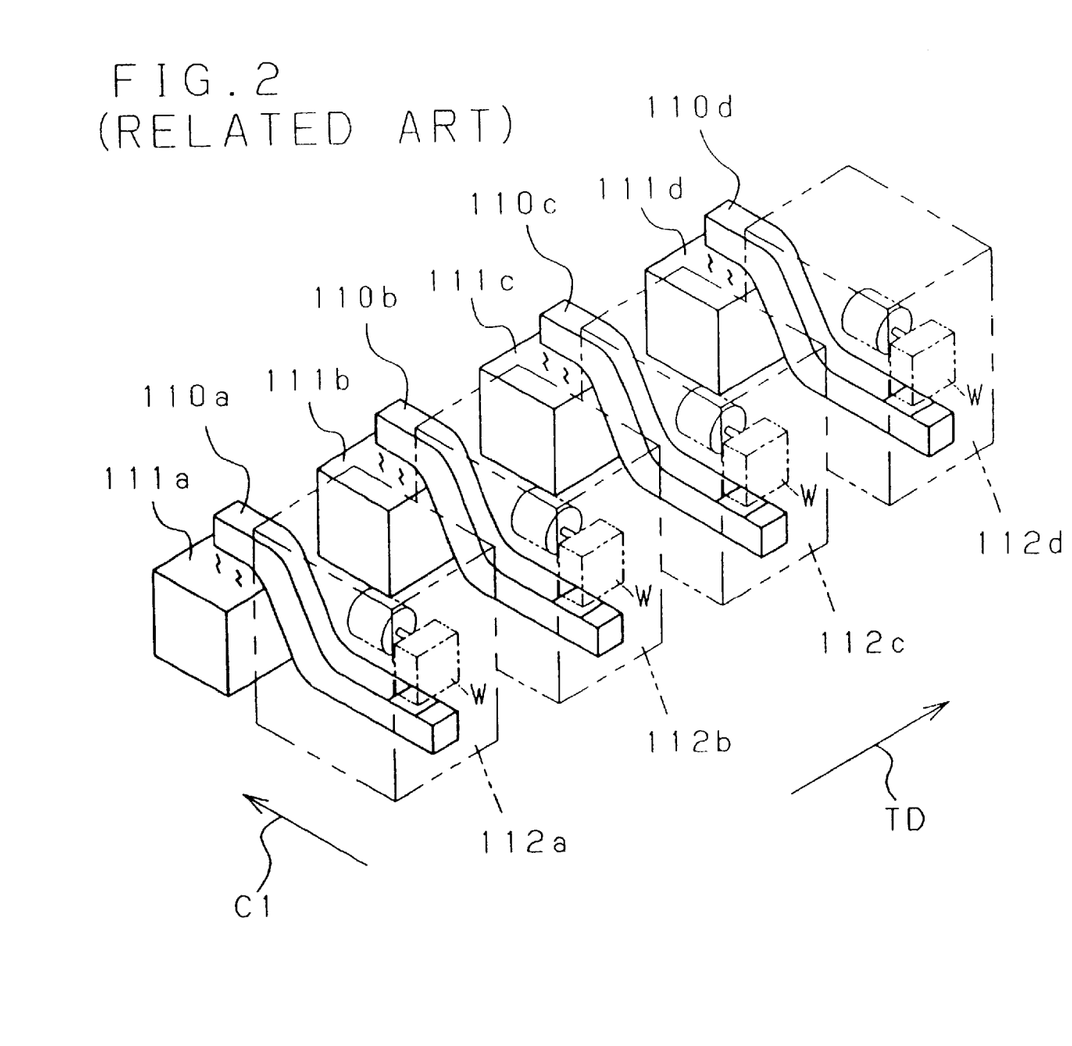
FIG. 2 is a perspective view showing an example of another conventional machining system.

FIG. 2 shows another machining system having a plurality of chip conveyors 110a to 110d, each of which respectively serves one of the machine tools 112a to 112d spaced along a transfer direction TD. Each of the chip conveyers 110a to 110d extends under the machining area of a machine tool 112a to 112d in a direction C1 intersecting the transfer direction TD. Chips generated in each of the machine tools 112a to 112d are respectively carried by the chip conveyors 110a to 110d to corresponding chip containers 111a to 111d. The machining system thus requires the same number of the chip containers 111a to 111d as chip conveyors 110a to 110d.

SUMMARY OF THE INVENTION

Accordingly, it is an object of the present invention to provide an improved machining system which can be easily restructured.

In accordance with the invention, the above and other objects are achieved by a machining system including a plurality of machine tools, a transfer apparatus configured to move a workpiece, and a plurality of chip conveyors. Each of the plurality of chip conveyors includes a feeding device, a discharging opening and at least one of a first opening and a second opening. The first opening communicates with the discharging opening of an adjacent chip conveyor of the plurality of chip conveyors. The second opening receives chips generated by at least one of the plurality of machine tools. The discharging opening is for discharging the chips in the chip conveyor. The feeding device is configured to move the chips in the chip conveyor toward the discharging opening.

It is a second object of the present invention to provide an improved chip conveyor easily connected to another chip conveyor. In accordance with the invention, the above and other objects are achieved by a chip conveyor having a body and a feeding device. The body includes a chip-receiving portion and a chip-discharging portion. The chip-receiving portion has a first opening configured to serially communicate with an adjacent chip conveyor, and a second opening receiving chips. The chip-discharging portion includes a discharging opening for discharging the chips. The feeding device is attached to the body and is configured to move the chips in the body toward the discharging opening.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 3:
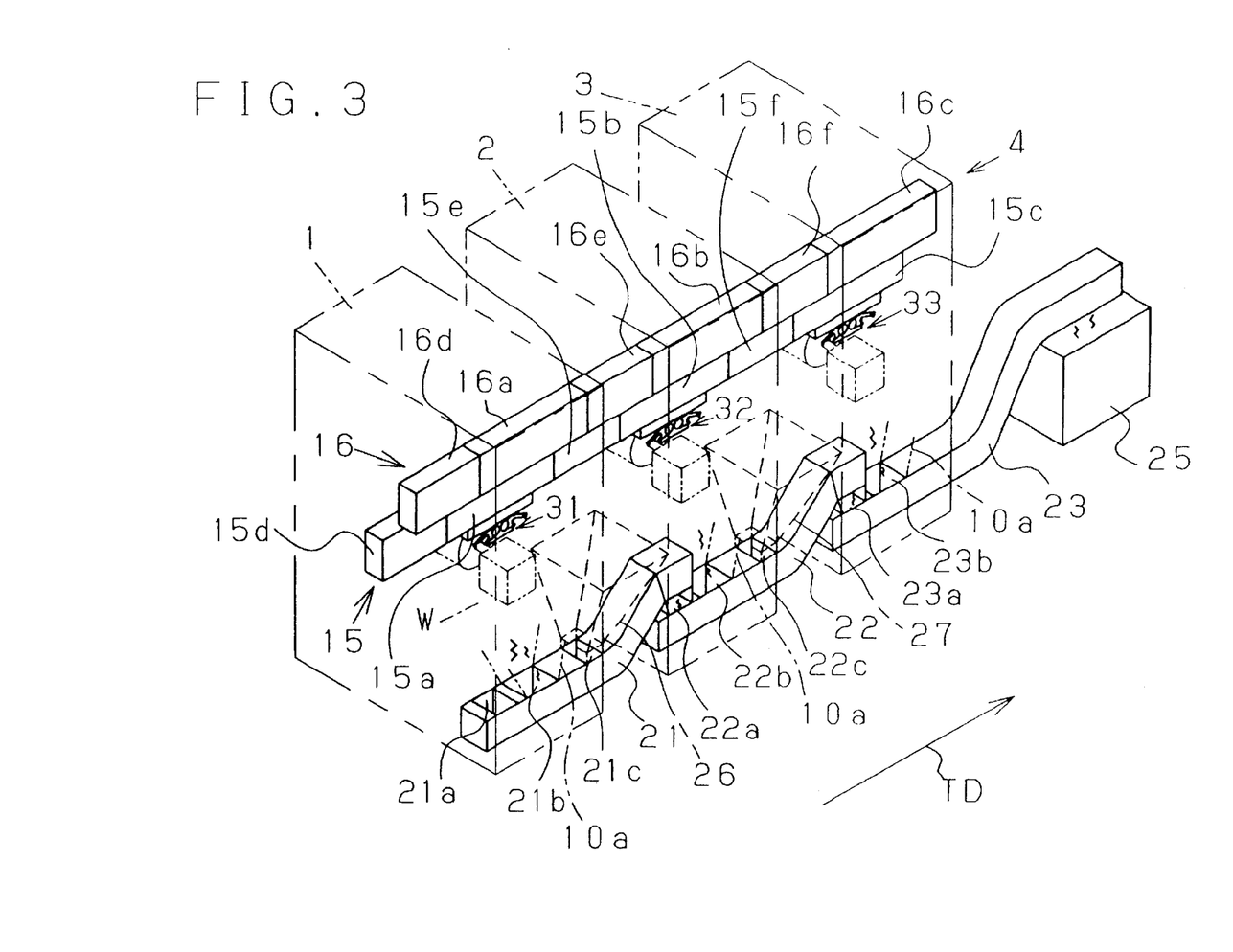
FIG. 3 is a perspective view showing a machining system according to an embodiment of the present invention.
Figure 4:
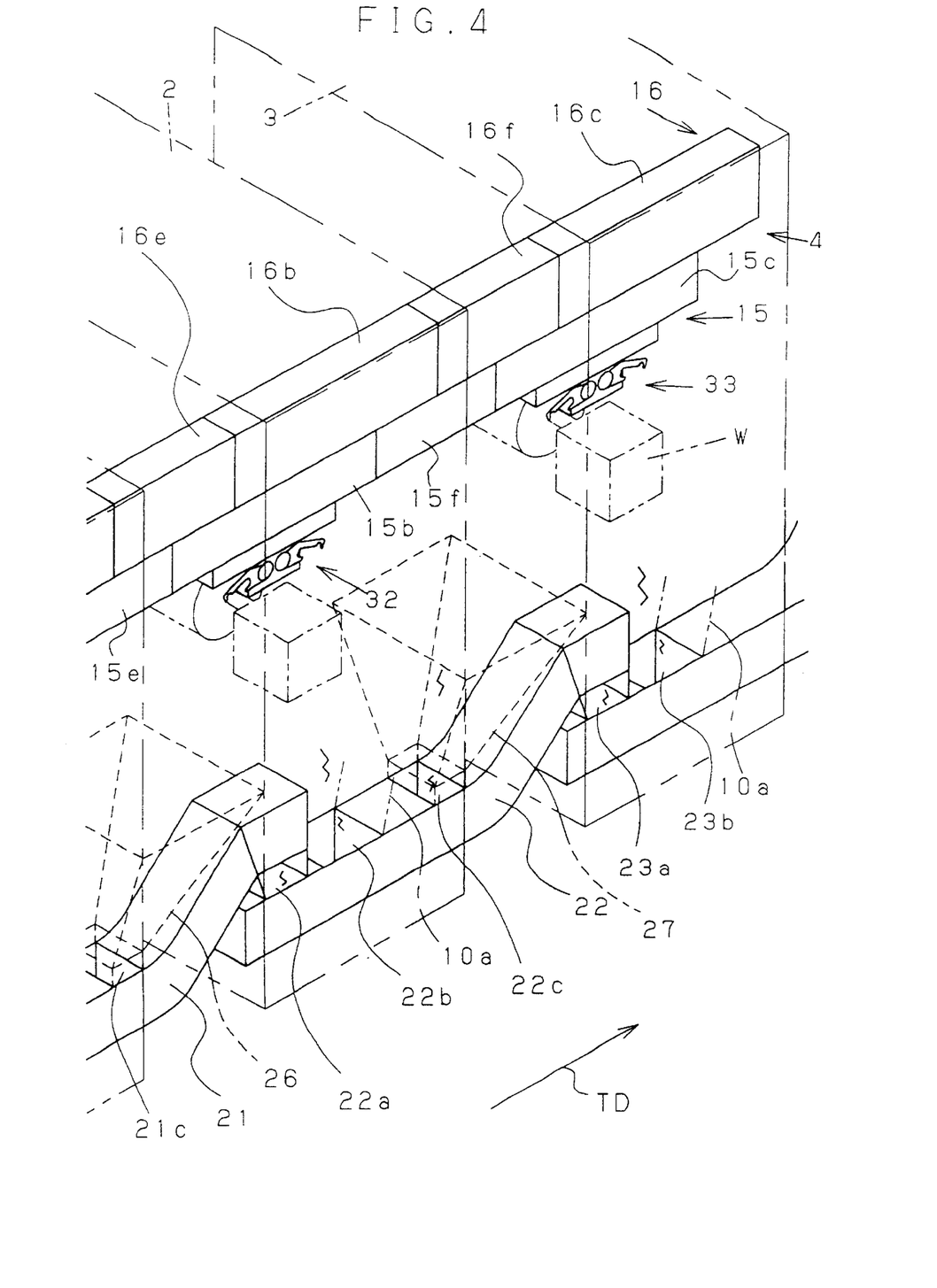
FIG. 4 is an enlarged perspective view showing the machining system according to the embodiment of FIG. 3.

FIGS. 3 and 4 show a machining system including three machine tools 1, 2 and 3, transfer apparatus 4, and chip conveyors 21, 22 and 23.

The machine tools 1, 2 and 3 are spaced and aligned along a transfer direction TD. The transfer direction TD is defined as a direction along which the transfer apparatus 4 carries a workpiece W.

The transfer apparatus 4 includes two transfer ways 15 and 16 positioning above a working area of the machine tools 1, 2 and 3 in parallel with the transfer direction TD. Travel devices 31, 32 and 33 are movably arranged on the transfer way 15.

The chip conveyors 21, 22 and 23 are connected in series substantially in parallel with the transfer direction TD, under each of the machining areas of the machine tools 1, 2 and 3. The chips locating in the chip conveyors 21, 22 and 23 are successively transferred from the upstream side chip conveyor 21 to the downstream side chip conveyor 23, and are finally dumped into a chip container 25.

Chutes 26 and 27 are respectively fixed between the machine tools 1, 2 and 3 in this order and are located under the transfer apparatus 4. These chutes 26 and 27 catch the chips falling from the workpiece W while the transfer apparatus 4 moves the workpiece W between the machine tools 1, 2 and 3, so as to lead the chips to the chip conveyors 21 and 22.

Figure 5:
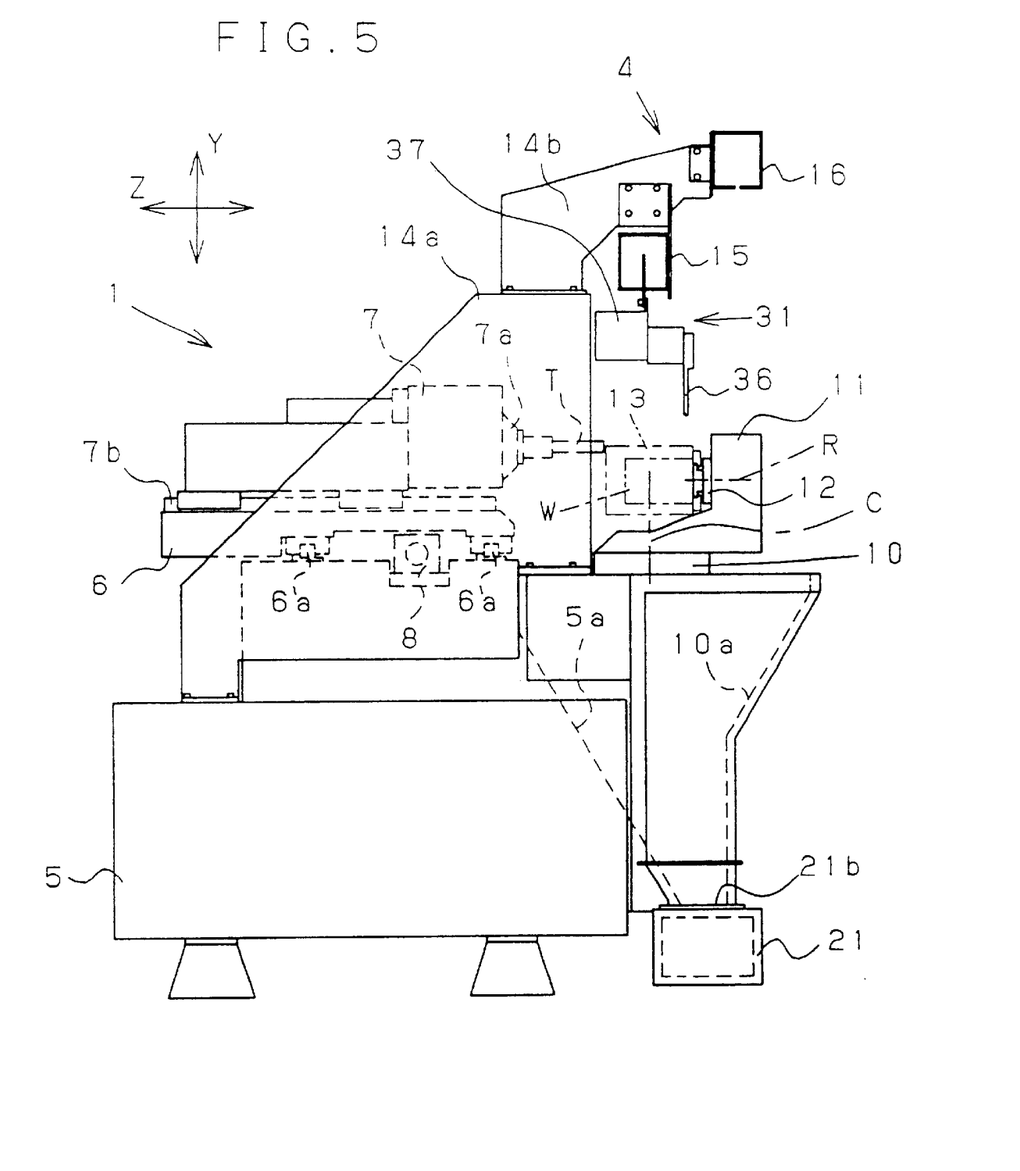
FIG. 5 is a side view showing a machine tool according to the embodiment of FIG. 3.

The following description will refer to the machine tool 1 as representative of the machine tools 1, 2 and 3, since the machine tools 1, 2 and 3 are substantially identical. As shown in FIG. 5, an X-axis table 6 is slidably mounted on X-axis guides 6a fixed on a bed 5 for movement in an X-axis direction perpendicular to the plane of FIG. 5. An X-axis motor 8 drives the X-axis table 6 along the X-axis guides 6a. A spindle head 7 is slidably mounted on Z-axis guides 7b fixed on the X-axis table 6 in a Z-axis direction horizontally indicated in FIG. 5. One of the Z-axis guides 7b is not illustrated. An unillustrated Z-axis motor drives the spindle head 7 along the Z-axis guides 7b. The spindle head 7 rotatably supports a spindle 7a. A tool T is attached to the spindle 7a.

A Y-axis table 10 is mounted in front of the bed 5. The Y-axis table 10 is vertically moved in a Y-axis direction by an unillustrated motor. A C-axis table 11 is rotatably supported on the Y-axis table 10 to turn around a C-axis parallel to the Y-axis. A pallet holder 12 is rotatably attached on the C-axis table 11 to hold a pallet 13 clamping the workpiece W. The pallet holder 12 turns around an R-axis perpendicular to the C-axis. The X-axis table 6, the spindle head 7 and the Y-axis table 10 cooperatively create a three dimensional relative motion between the tool T and the workpiece W clamped on the C-axis table 11. The C-axis table 11 and the pallet holder 12 change an attitude of the workpiece W to the tool T by their rotational motions. These motions allow the workpiece W to be machined into a required shape.

A slope 5a is formed on a front face of the bed 5 and a slope 10a is arranged under and around the Y-axis table 10. The slopes 5a and 10a lead the chips machined off the workpiece W to the chip conveyor 21 through a second opening 21b formed on an upper surface of the chip conveyor 21.

Figure 6:
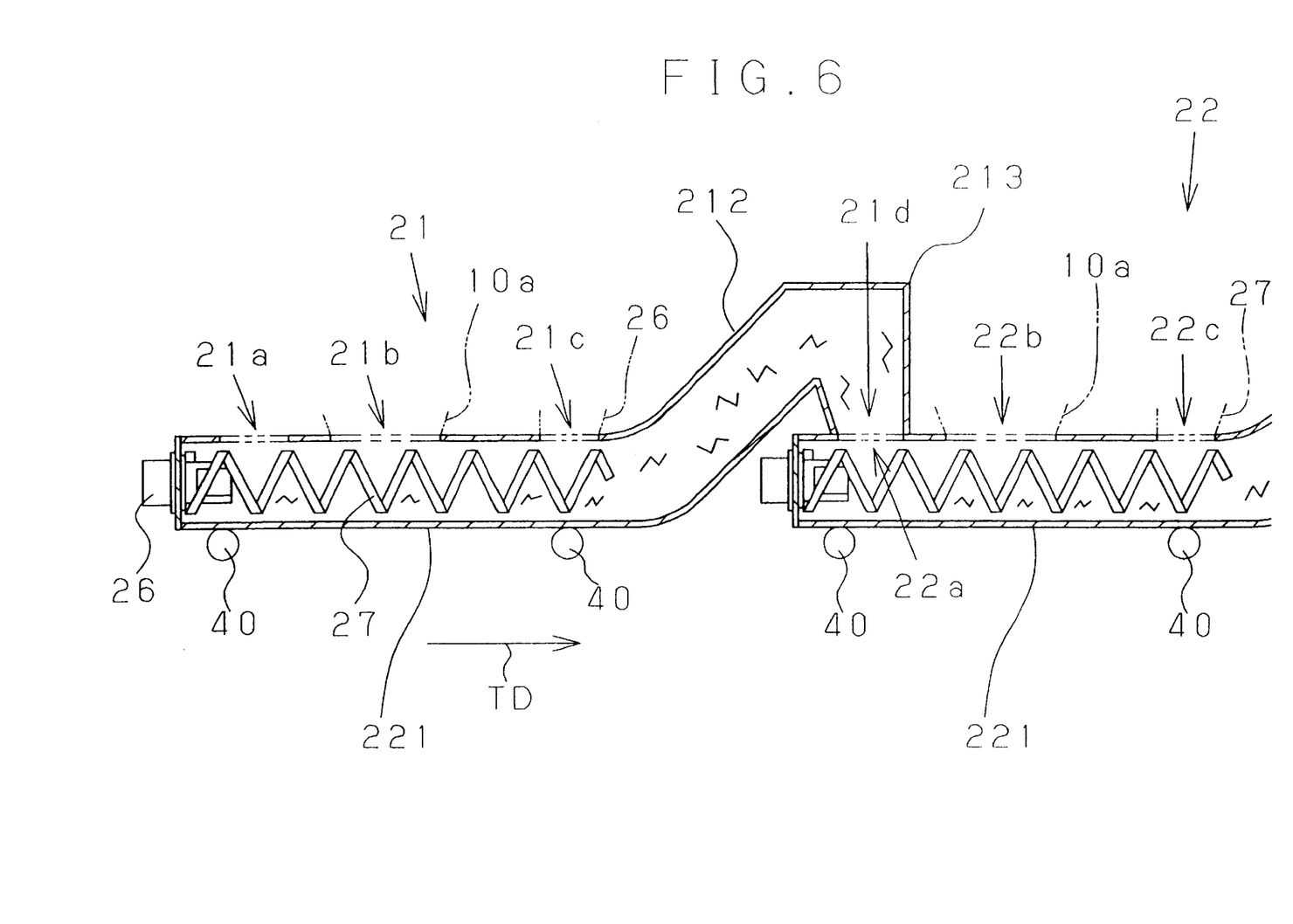
FIG. 6 is a sectional side view showing chip conveyors according to the embodiment of FIG. 3.

The chip conveyor 21 will be described as representative of the chip conveyors 21 and 22 because the chip conveyors 21 and 22 are substantially identical. As shown in FIG. 6, the chip conveyor 21 has a generally closed body of rectangular cross-section and is composed of a chip-receiving portion 211, a middle portion 212 and a chip-discharging portion 213. The middle portion 212 extends upwardly to connect between the chip-receiving portion 211 and the chip-discharging portion 213, so that the chip-discharging portion 213 is positioned above the chip-receiving portion 221 of the chip conveyor 22.

The chip conveyor 21 includes a feeding device composed of a motor 26 attached on an end of the chip-receiving portion 211, and a conveying coil 27 rotatably driven by the motor 26. The conveying coil 27 is made from a wire spirally wound in the chip-receiving portion 211 so that rotation of conveying coil 27 carries the chips toward the chip-discharging portion 213.

The chip-receiving portion 211 has a first opening 21a, the second opening 21b and the third opening 21c respectively formed on the upper surface of the chip-receiving portion 211, in this order from the end of the chip-receiving portion 211 to the middle portion 212.

The first opening 21a is used to receive the chips discharged from an upstream side chip conveyor. Since the chip conveyor 21 does not have the upstream side chip conveyor in this embodiment, the first opening 21a is not used. On the other hand, a first opening 22a of the chip conveyor 22 receives the chips carried from the chip conveyor 21.

As illustrated in FIG. 5, the second opening 21b is connected at the downstream ends of the slopes 5a and 10a to receive the chips falling from the machining area of the machine tool 1.

The third opening 21c connects to the chutes 26 so as to receive the chips falling from the transfer apparatus 4 or scraps scattered between the machine tools 1 and 2.

The chip-discharging portion 213 extends downwardly to a discharge opening 21d, and is inserted into the first opening 21a of the chip conveyor 22 through a seal such as a urethane rubber sheet. The chip conveyor 21 transfers the chips to the chip conveyor 22 through the discharging opening 21d and the first opening 22a.

The chip-discharging portion 213 of the chip conveyor 21 can optionally be fixed in the first opening of the chip conveyor 22 by bolts, but the discharging opening 21d and the first opening 22a can instead only face each other.

Casters 40 are attached on a bottom surface of the chip-receiving portion 211 so that the chip conveyor 21 can be rolled to be replaced.

Figure 7:
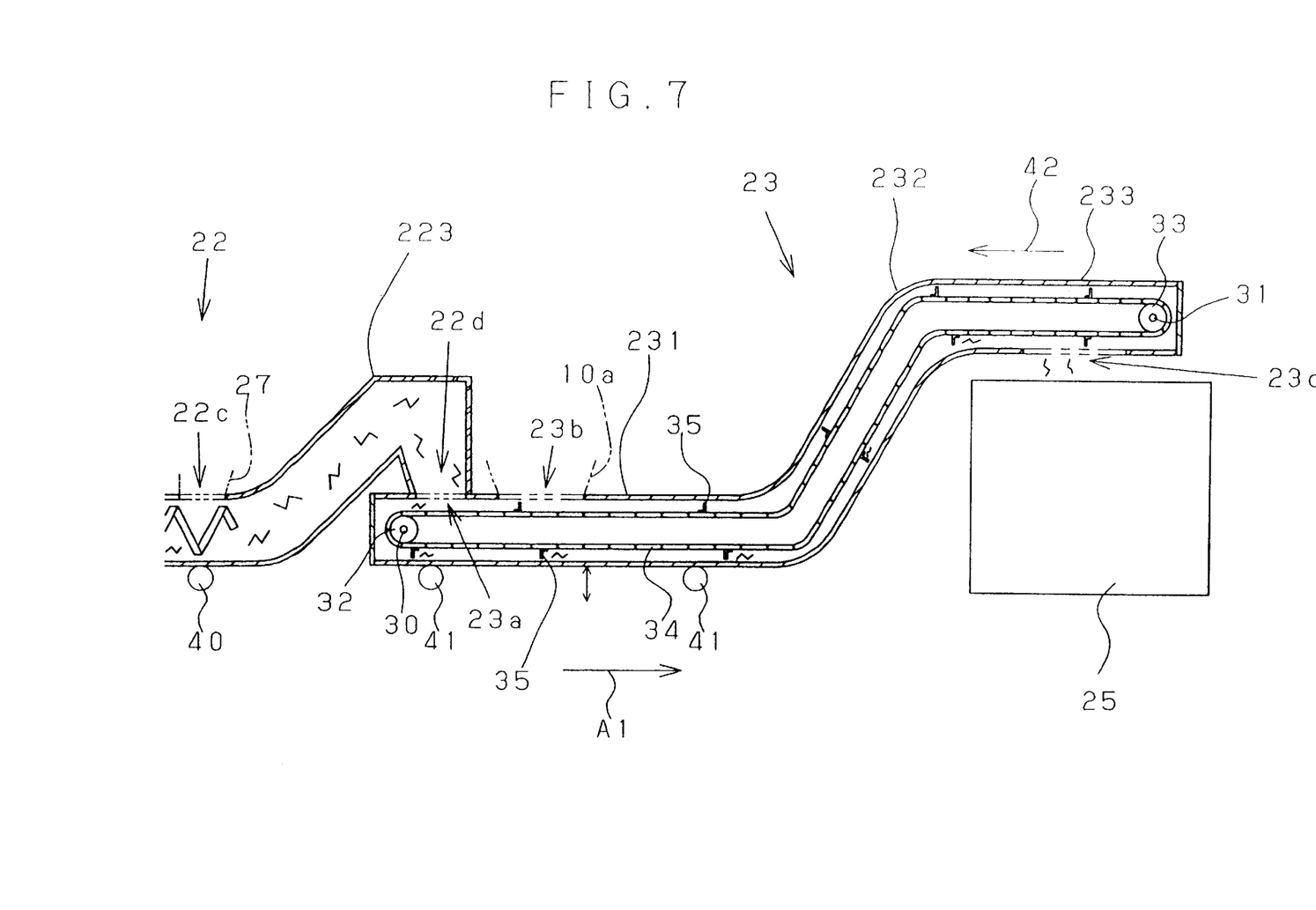
FIG. 7 is a sectional side view showing chip conveyors according to the embodiment of FIG. 3.

The chip conveyor 23 shown in FIG. 7 is different from the chip conveyors 21 and 22. The chip conveyor 23 has a body including a chip-receiving portion 231, a middle portion 232 and a chip-discharging portion 233. The middle portion 232 extends upwardly to connect between the chip-receiving portion 231 and the chip-discharging portion 233 so that the chip-discharging portion 233 is positioned above the chip container 25.

A first opening 23a and a second opening 23b are formed on an upper surface of the chip-receiving portion 231, from the end of the chip-receiving portion 231 to the middle portion 232, in this order. The end of the upstream side chip conveyor 22 is inserted into the first opening 23a to transfer the chips from the chip conveyor 22 to the chip conveyor 23. As with the connection between conveyors 21 and 22, an unillustrated seal, e.g., a urethane rubber sheet, is inserted between the first opening 23a and the chip-discharging portion 223 of the upstream side chip conveyor 22. The chip-discharging portion 223 of the chip conveyor 22 can be fixed in the first opening of the chip conveyor 23 by bolts, or the discharging opening 22d and the first opening 23b can only face each other.

The second opening 23b is beneath the slopes 5a and 10a of the machine tool 3 to receive the chips falling from the machining area of the machine tool 3. The chip-discharging portion 233 has a discharge opening 23d on a bottom surface thereof to face the chip container 25.

Sprocket wheels 32 and 33 respectively fixed on shafts 30 and 31 are rotatably supported at each end of the chip conveyor 23. The sprocket wheels 32 and 33 engage an endless chain 34. Another pair of unillustrated sprocket wheels is also mounted on shafts 30 and 31 behind the sprocket wheels 32 and 33 and engages an endless chain, not shown.

A plurality of L-shape members 35 are fixed on a pair of the endless chains 34 at equal intervals. An unillustrated motor drives the shaft 30 counterclockwise so that the L-shape members 35 travel rightward and turn leftward at the shaft 31, as indicated by arrows A1 and A2 in FIG. 7. Therefore, the chips received from the first opening 23a and the second opening 23b are carried to the discharge opening 23d so that the chips are dumped into the chip container 25. A feeding device of the chip conveyor 23 is substantially composed of the sprocket wheels 32 and 33, the shafts 30 and 31, the plurality of L-shape members 35, the endless chains 34 and the motor.

Casters 41 are attached on a bottom surface of the chip-receiving portion 231, so that the chip conveyor 23 may be rolled to be replaced.

The transfer apparatus 4 includes the transfer ways 15 and 16 extending parallel to the transfer direction TD. The transfer ways 15 and 16 are supported by a bracket 14b fixed on a cover 14a mounted on the base 5 to cover the machine tool. The transfer way 16 is positioned in front of and above the transfer way 15 with a predetermined distance.

The transfer way 15 is made up of main rails 15a, 15b, 15c, and sub-rails 15d, 15e and 15f for connecting main rails 15a, 15b and 15c. Each of the rails 15a, 15b, 15c, 15d, 15e and 15f has a reversed U-sectional shape to receive the travel devices 31, 32 and 33. The transfer way 16 is also made up of main rails 16a, 16b, 16c, and sub-rails 16d, 16e and 16f for connecting main rails 16a, 16b and 16c. Each of rails 16a, 16b, 16c, 16d, 16e and 16f also has a reversed U-sectional shape.

The travel devices 31, 32 and 33 are independently attached on the transfer way 15 to be slid by an unillustrated linear-motor mechanism including a coil fixed in the transfer way 15 and a magnet installed in each of the travel devices 31, 32 and 33. Each of the travel devices 31, 32 and 33 has a pair of grip fingers 36 operated by motors 37 for grasping the pallet 13 holding the workpiece W, so as to deliver the workpiece W between the machine tools 1, 2 and 3.

The transfer way 16 is provided for auxiliary use to move the workpiece W.

The operation of the machining system is described hereinafter.

When the workpiece W is machined in the machining area around the Y-axis table 10 in the machine tool 1, the chips cut from the workpiece W are led into the chip conveyor 21 by the slopes 5a and 10a leading to the second opening 21b. The machine tools 2 and 3 concurrently machine respective workpieces W, so that the chips are led to the chip conveyors 22 and 23 through the second openings 22b and 23b, respectively.

After the machining ends, the workpieces W are independently or simultaneously delivered to the next machine tool in the transfer direction TD by the travel devices 31, 32 and 33 of the transfer apparatus 4. An unillustrated loader extracts the workpiece W machined by the final machine tool 3.

The chutes 26 and 27 receive the chips falling from the workpieces W while the transfer apparatus 4 delivers the workpieces W, so that the chips are led into the chip conveyors 21 and 22 through the respective third openings 21c and 22c.

The conveying coil 27 of the chip conveyor 21 driven by the motor 26 feeds the chips gathered in the chip-receiving portion 211 to the chip-discharging portion 213 through the middle portion 212, so that the chips are discharged from the discharging opening 21d of the chip conveyor 21 to the first opening 22a of the chip conveyor 22.

In the same way, the conveyor 22 transfers the chips to the conveyor 23.

The L-shape members 35 of the conveyor 23 carry the chips in the chip-receiving portion 231 to the chip-discharging portion 233 along an inner bottom surface of the conveyor 23. Finally, the chips are discharged from the discharging opening 23d to the chip container 25.

As described above, though the chips are carried in the same direction as the transfer direction TD, the opposite direction can be applied.

Figure 8:
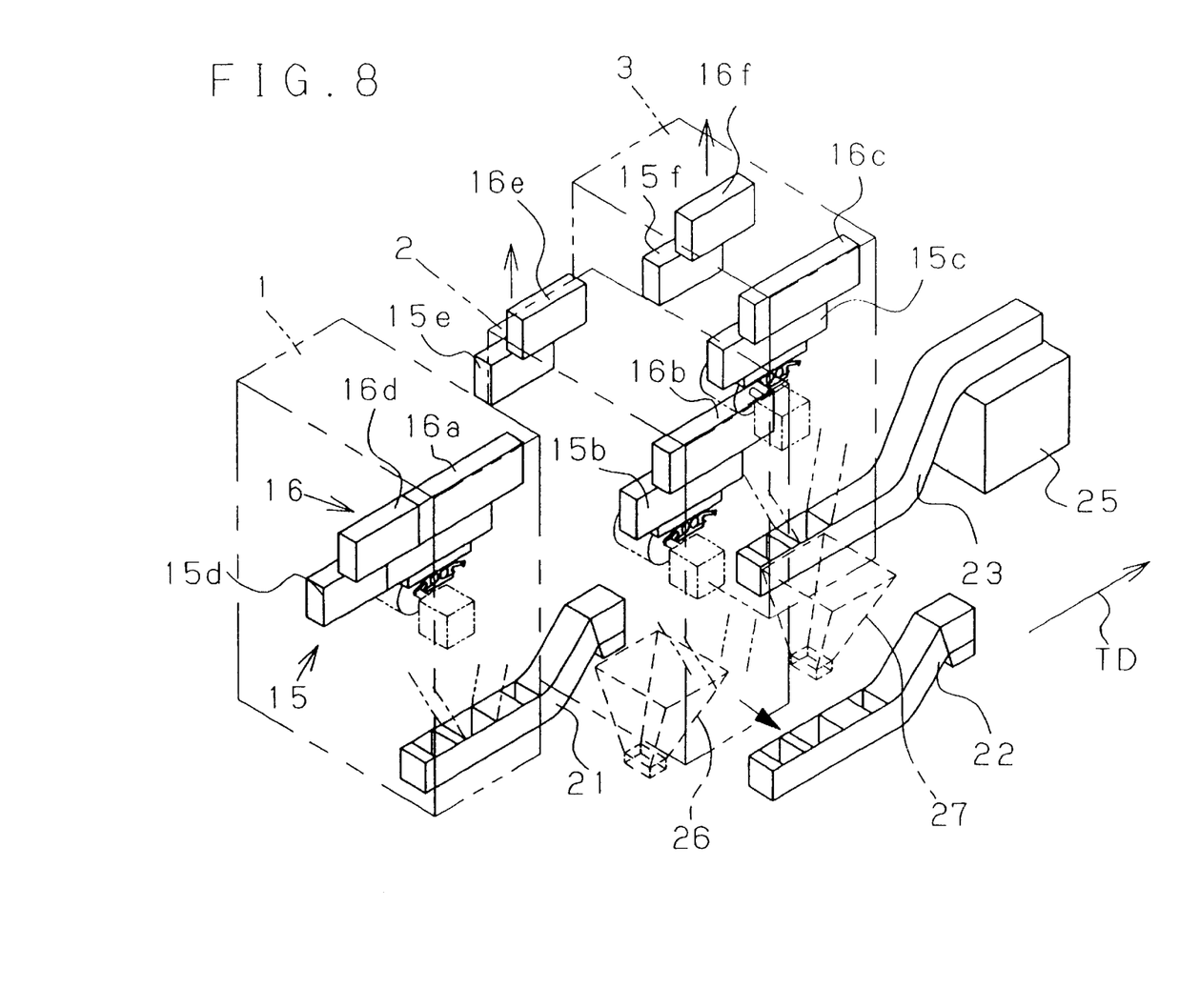
FIG. 8 is a perspective view showing the machining system according to the embodiment of FIG. 3 during reconstruction of the machining system.

The process of reconstruction of the machining system, for example in the case that the machine tool 2 is removed from the machining system, is described hereinafter. First, as shown in FIG. 8, the chip conveyor 22 is removed from the machine tool 2 to the outside of the machining system in a direction perpendicular to the transfer direction TD. The chip conveyor 22 is easily moved because of the casters 40.

Next, the main rails 15b and 16b of the transfer apparatus 4 are disconnected by removing the sub-rails 15e, 15f, 16e and 16f. The chutes 26 and 27 are also disconnected.

Then, the machine tool 2 is removed from the machining system to the outside in the direction perpendicular to the transfer direction TD.

After that, the machine tool 1 and conveyor 21 are shifted to connect with the machine tool 3 and conveyor 23 in the transfer direction TD, respectively.

Finally, the main rails 15c and 16c are connected to corresponding main rails 15a and 16a by the sub-rails 15e and 16e (or the sub-rails 15f and 16f). In addition, the chute 26 (or 27) is reconnected between the machine tools 1 and 3, so that the reconstruction of the machining system is completed.

As described above, the machining system is easily and quickly reconstructed. Namely, a total length of the chip conveyors is easily regulated by changing the number of the chip conveyors when a length of the machining system or the number of the machine tools is changed.

The serial connection of the chip conveyors 21, 22 and 23 allows one to gather chips from the machining area and from the transfer apparatus 4 effectively because the chip conveyors 21, 22 and 23 extend along the transfer direction TD and under the transfer apparatus 4. In the case that one of the chip conveyors 21, 22 and 23 needs repair, it can easily be removed to be exchanged for another chip conveyor. In addition, the machining system requires only one chip container 25 so that the cost of the machining system is reduced, and waste management and chip disposal become easy and efficient.

Though this embodiment shows that each of the machine tools 1, 2 and 3 respectively has one chip conveyor, in the case of a very long machining system composed of many machine tools, two or three machine tools can share one chip conveyor to reduce the cost of the machining system.

Moreover, although the chip conveyor 3 is different from the chip conveyors 1 and 2, all chip conveyors can be of the same type.

If chips do not fall from the workpiece W during the shifting by the transfer apparatus 4, the third openings 21c and 22c can be omitted. In addition, by enlarging the second opening of the chip conveyor, it serves both as the second opening and the third opening.

Obviously, numerous modifications and variations of the present invention are possible in light of the above teachings. It is therefore to be understood that within the scope of the appended claims, the present invention may be practiced otherwise than as specifically described herein.

What is claimed is:

1. A machining system comprising:

a plurality of machine tools;

a transfer apparatus configured to move a workpiece;

a plurality of serially connected chip conveyors, each of said plurality of chip conveyors including a feeding device, a discharging opening and a first opening and a second opening, said first opening communicating with the discharging opening of an adjacent chip conveyor of said plurality of chip conveyors, said second opening receiving chips generated by at least one of said plurality of machine tools, said discharging opening discharging the chips in said chip conveyor, and said feeding device being configured to move the chips in said chip conveyor toward said discharging opening.

2. A machining system according to claim 1, wherein said chip conveyor further includes a third opening receiving chips falling from said transfer apparatus.

3. A machining system according to claim 2, further comprising a chute arranged between said machine tools for leading the chips to said third opening.

4. A machining system according to claim 1, wherein said plurality of said chip conveyors are serially connected to extend substantially parallel to a transfer direction of said transfer apparatus moves the workpiece along.

5. A machining system according to claim 1, wherein said transfer apparatus comprises a transfer way composed of a plurality of rails and a transfer device slidably mounted on said transfer way to move the workpiece.

6. A machining system according to claim 5, wherein said plurality of said chip conveyors extend substantially under said transfer way.

* * * * *